(12) United States Patent
McConnell et al.

(10) Patent No.: US 7,814,778 B2
(45) Date of Patent: Oct. 19, 2010

(54) FACEPLATE CONNECTION ASSEMBLY AND METHOD

(75) Inventors: Thomas G. McConnell, Dunlap, IL (US); Robert E. Longmire, Naperville, IL (US)

(73) Assignee: Caterpillar Inc, Peoria, IL (US)

( * ) Notice: Subject to any disclaimer, the term of this patent is extended or adjusted under 35 U.S.C. 154(b) by 423 days.

(21) Appl. No.: 12/019,258

(22) Filed: Jan. 24, 2008

(65) Prior Publication Data
US 2009/0188301 A1 Jul. 30, 2009

(51) Int. Cl.
G01M 3/22 (2006.01)
G01M 3/28 (2006.01)
(52) U.S. Cl. ............................. 73/49.8; 73/40.7; 73/46
(58) Field of Classification Search ................. 73/40.7, 73/46, 49.8
See application file for complete search history.

(56) References Cited

U.S. PATENT DOCUMENTS

| | | |
|---|---|---|
| 2,350,867 A | 6/1944 | Bean et al. |
| RE30,311 E | 6/1980 | Chaplin et al. |
| 4,420,970 A | 12/1983 | Organi |
| 4,888,979 A | 12/1989 | Steeper |
| 5,074,663 A | 12/1991 | Winterton et al. |
| 5,170,659 A | 12/1992 | Kemp |
| 5,461,904 A | 10/1995 | Baker |
| 6,000,278 A | 12/1999 | Hystad |
| 6,279,382 B1 | 8/2001 | Yatagai |
| 6,450,012 B1 * | 9/2002 | Mayer et al. ................. 73/49.3 |

* cited by examiner

Primary Examiner—John Fitzgerald
(74) Attorney, Agent, or Firm—Leydig, Voit & Mayer

(57) ABSTRACT

A faceplate connection assembly and method adapted to promote detection of a missing or defective seal element. The faceplate connection includes a surface member having a pair of opposing face elements. A seal seating depression adapted to accept a compressible seal element disposed at least partially across at least one face. A fluid transport channel of open groove construction is disposed in intersecting relation to the seal seating depression. The fluid transport channel is in fluid communication with a port at an exterior portion of the faceplate connection assembly. According to the method a tracer fluid is introduced at a predefined edge of the seal seating depression and migration of the tracer fluid across the seal seating depression is monitored. Detection of migration across the seal seating depression indicates a missing or defective seal element.

20 Claims, 3 Drawing Sheets

FACEPLATE CONNECTION ASSEMBLY AND METHOD

TECHNICAL FIELD

This patent disclosure relates generally to faceplate connection assemblies and, more particularly, to a faceplate connection assembly and method adapted to facilitate detection of a missing or defective sealing element.

BACKGROUND

Numerous devices utilize components connected using faceplate connections wherein the components are connected at an interface between two opposing face surfaces held in contacting abutting relation to one another. By way of example only, and not limitation, such connections are frequently utilized to couple components of systems such as hoses and fluid lines wherein a fluid in a gaseous or liquid state is being held or transported under pressure. By way of further example, such connections may also be utilized to connect components of vacuum systems having an interior vacuum chamber maintained at a negative pressure relative to the atmosphere. Of course, such connection systems may also be used in any number of other environments to provide a secure seal which is resistant to contamination or leakage.

Regardless of the final environment of use, a typical feature of a faceplate connection is the use of a compressible seal element such as an o-ring or a compressible disc or the like normally held in compressed seal-forming relation between the opposing face surfaces. Such a compressible seal element may be held within an axially depressed seating zone disposed across at least one of the opposing face surfaces axially outboard of a fluid or vacuum interior containment region. When the connection between face surfaces is properly made, the seal element is pressed into the depressed seating zone and deforms to fill the seating zone and to surround any minor irregularities in the opposing surface structures so as to substantially fill and block any voids which might otherwise be present, thereby establishing a fluid tight seal around the interior containment region. Historically, due to the presence of irregularities on the face surfaces, the absence of a seal element or a defect in the seal element would be readily detectable by pressurized leak testing at the time that the faceplate connection was assembled.

One such system is shown and described in U.S. Pat. No. 4,888,979 to Steeper entitled "Leak Detection Aid" having a filing date of Feb. 15, 1989, and an issue date of Dec. 26, 1989. In that system, a flange forming one half of a faceplate connection is provided with a first axially depressed circumferential groove defining an o-ring seating zone. A second circumferential groove is arranged in surrounding, spaced outboard relation to the o-ring seating zone. The second or outboard circumferential groove includes an inlet port for introduction of a tracer fluid such as helium and an outlet port for withdrawal of the tracer fluid. In operation, after the faceplate connection is assembled, the tracer fluid is injected into the inlet port and fills the outboard circumferential groove before being withdrawn through the outlet port. While the tracer fluid is present within the system, locations radially inboard of the o-ring seating zone are monitored for the presence of the tracer fluid. Detection of the tracer fluid at locations inboard of the o-ring seating zone indicate a leaking or missing o-ring.

Advancements in machining processes have greatly improved the standard quality of face surfaces used within faceplate connections. Thus, the face surfaces themselves may be sufficiently free from irregularities such that a fluid tight seal may be formed when those surfaces are placed in initial face to face contacting relation, even in the absence of a properly functioning compressible seal at the interface. However, the fluid tight relation may tend to degrade over time in the absence of a properly functioning compressible seal. Thus, a system is desired to detect an omitted or defective seal within a faceplate connection assembly at the time of initial construction.

The foregoing background discussion is intended solely to aid the reader. It is not intended to limit the disclosure, and thus should not be taken to indicate that any particular element of a prior system is unsuitable for use within the disclosed examples, nor is it intended to indicate any element, including solving the motivating problem, to be essential in implementing the examples described herein. The full scope of the implementations and application of the examples described herein are defined by the appended claims.

SUMMARY

In one aspect, the present disclosure provides a faceplate connection assembly adapted to promote detection of a missing or defective seal element. The faceplate connection includes a first surface member having a face and a second surface member having face disposed in opposing relation to at least a portion of the face of the first surface member along an interface. A seal seating depression adapted to accept a compressible seal element is disposed at least partially across the face of the first and/or second surface member. A fluid transport channel of open groove construction is disposed in intersecting relation to the seal seating depression. At least a portion of said fluid transport channel extends along the interface between the first face and the second face. The fluid transport channel is in fluid communication with a port at an exterior portion of the faceplate connection assembly.

In accordance with another aspect, the present disclosure provides a method of detecting a missing or defective seal element in a faceplate connection assembly. According to the method, a faceplate connection is provided including a first surface member having a face and a second surface member having a face disposed in contacting opposing relation to at least a portion of the face of the first surface member. A seal seating depression adapted to accept a compressible seal element is disposed at least partially across the face of the first and/or second surface member. A fluid transport channel of open groove construction is disposed in intersecting relation to the seal seating depression. The first surface member is operatively connected to the second surface member such that at least a portion of the fluid transport channel extends along the interface between the first face and the second face. A fluid is introduced at a predefined edge of the seal seating depression through the fluid transport channel. Migration of the fluid across the seal seating depression is monitored.

DETAILED DESCRIPTION

Figure 1:
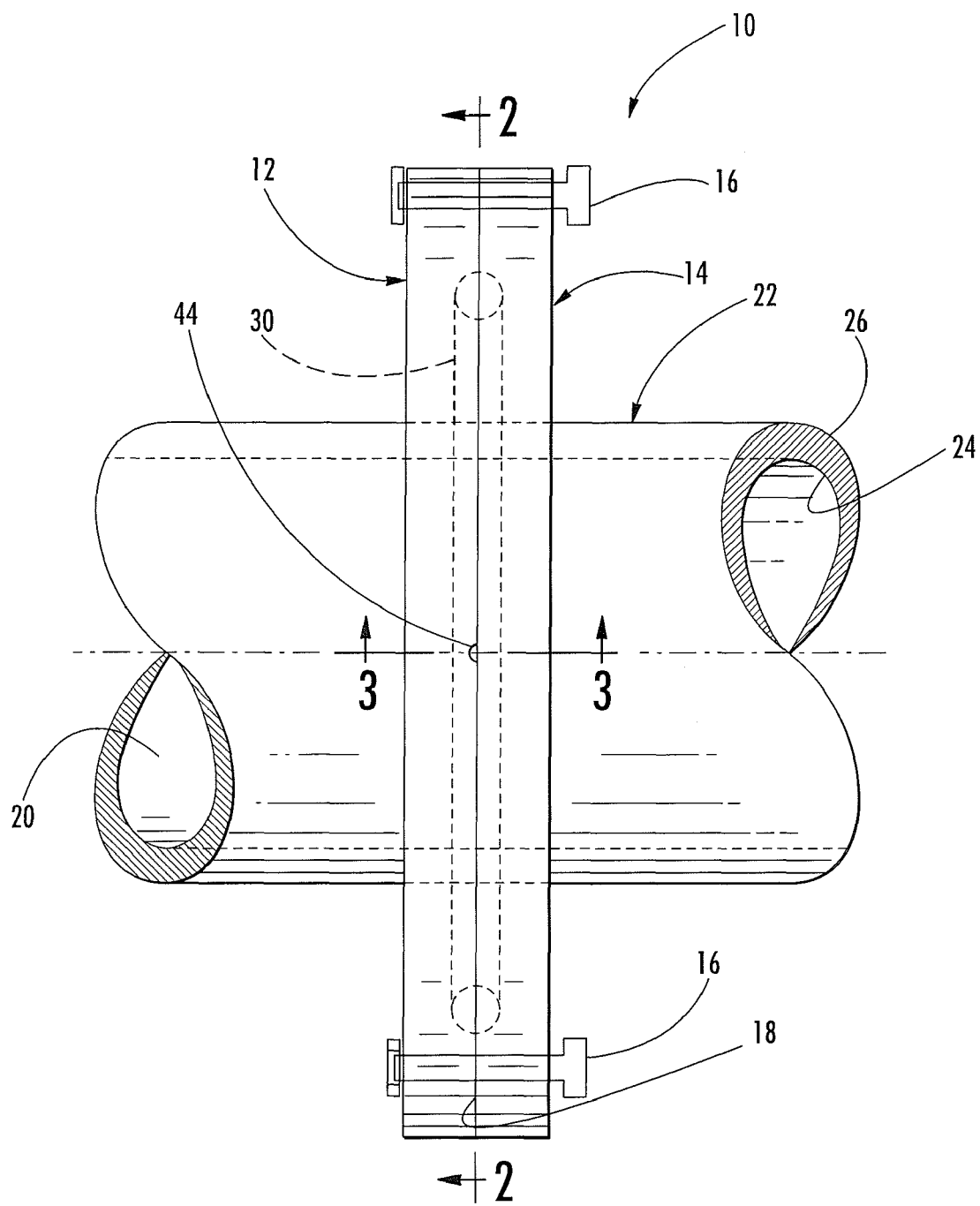
FIG. 1 is schematic side view of an exemplary faceplate connection assembly in fully assembled condition.

This disclosure describes a faceplate connection assembly adapted to promote detection of a missing or defective seal element. This disclosure further describes a method of detecting a missing or defective seal element in a faceplate connection assembly. Reference will now be made to the drawings wherein, to the extent possible, like elements are designated by like reference numerals throughout the various views.

FIG. 1 is schematic side view of an exemplary faceplate connection assembly 10 in fully assembled condition. In the illustrated exemplary construction, the faceplate connection assembly 10 incorporates a first surface member 12 and a second surface member 14 disposed in adjoined relation by connective members 16, such as bolts, screws or other suitable attachments with opposing face surfaces in substantially abutting relation along an interface 18. Of course, it is to be understood that the illustrated connection is exemplary only and that other connection systems may be utilized to join the surface members along interface 18 as may be desired.

In the illustrated exemplary construction, the first surface member 12 and the second surface member 14 are in the form of flanges disposed in substantially annular circumferential relation at least partially around an interior containment volume 20 bounded by a containment body 22 having an interior boundary wall 24 and exterior boundary wall 26. It is contemplated that the interior containment volume 20 may be adapted to contain fluids in either a gaseous or liquid state under positive pressure with either static or dynamic flow conditions. It is likewise contemplated that the interior containment volume may be adapted to operate under vacuum conditions relative to atmosphere. While the faceplate connection assembly 10 is illustrated for exemplary and explanatory purposes in the form of a double flange connection, it is to be understood that such a double flange connection is exemplary only and that the present disclosure is in no way limited to such constructions. Rather, the present disclosure relates to substantially any connection utilizing opposing faces having surface zones adapted to be held in contacting abutting relation outwardly displaced from a containment volume being sealed by the connection.

Regardless of the actual construction of the faceplate connection assembly, it is contemplated that a compressible seal element 30 will be disposed at an internal position such that the seal element is held in at least partially compressed relation at interface 18 when faceplate connection assembly 10 is in a fully assembled condition. By way of example only, and not limitation, the seal element 30 may be in the form of an o-ring of resilient material. However, other constructions such as compressible annular discs or other suitable sealing structures may likewise be utilized.

Figure 2:
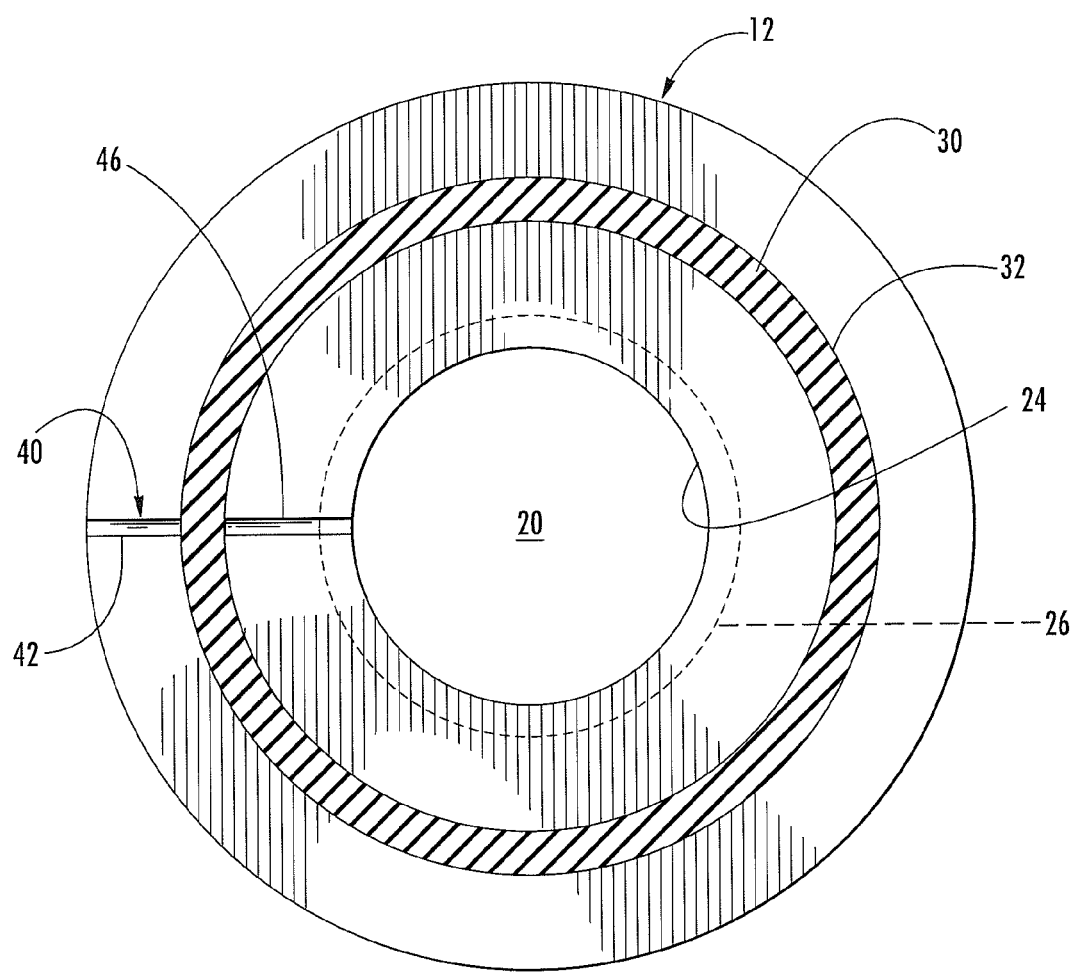
FIG. 2 is a schematic view taken generally along line 2-2 in FIG. 1.
Figure 3:
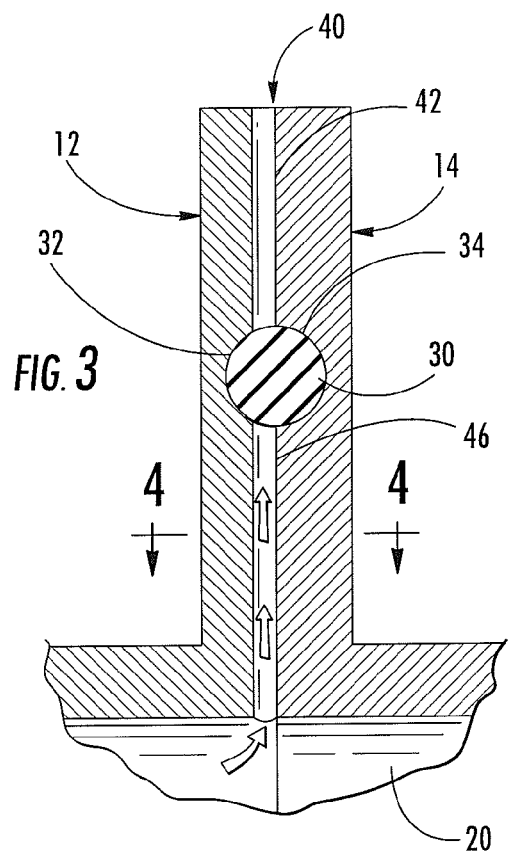
FIG. 3 is a schematic view taken generally along line 3-3 in FIG. 1 showing flow of a tracer fluid along a flow path between plate surfaces according to an exemplary practice.

As best illustrated through simultaneous reference to FIGS. 2 and 3, seal element 30 is seated in at least a first seal seating depression 32 disposed at least partially across a face surface of first surface member 12. If desired, seal element 30 may also be seated in a complementary opposing second seal seating depression 34 disposed at least partially across a face surface of second surface member 14 as shown in FIG. 3. However, it is contemplated that for many applications of use, second seal seating depression 34 may be eliminated if desired. In operation, upon tightening of the faceplate connection assembly 10, the seal element 30 is compressed and fills voids between the opposing faces of the first surface member 12 and the second surface member 14 in the vicinity of the seal element 30, thereby forming a fluid tight seal.

It is contemplated that complementary face surfaces of the first face surface member 12 and the second face surface member 14 may be formed of metal or other material of substantially inelastic character. It is further contemplated that such face surfaces may be formed by machining or other techniques with a degree of precision such that in an assembled condition the contacting face surfaces themselves may provide a substantially fluid tight character even if the seal element 30 is defective or is inadvertently omitted. Under such fluid restrictive conditions, the fluid tight character may tend to degrade prematurely over time.

Figure 4:
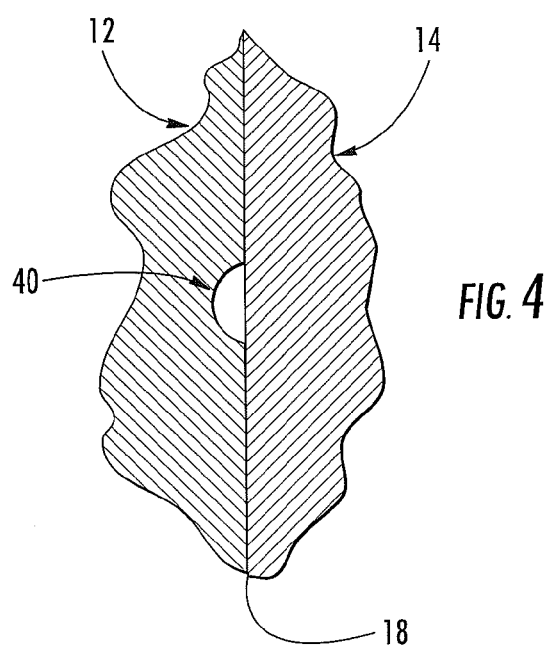
FIG. 4 is a schematic view taken generally along line 4-4 in FIG. 3 illustrating an exemplary construction of fluid transport channel according to an exemplary embodiment.

In order to identify a defective or missing seal element 30, the present disclosure contemplates the introduction of a fluid transport channel 40 defining a flow path intersecting and extending away from a seal seating depression adapted to hold the seal element 30 to an exterior port opening. In this regard, fluid transport channel 40 is disposed in intersecting relation to seal seating depression 32 such that the fluid transport channel 40 is in fluid communication with the seal seating depression. According to the exemplary construction illustrated in FIGS. 1-4, the fluid transport channel 40 is of a depressed, substantially open groove or trough configuration. As illustrated in FIGS. 3 and 4, at least a portion of the fluid transport channel 40 may run in a path in substantially adjacent relation to interface 18 such that the base of the fluid transport channel 40 is depressed relative to the interface 18 and the surface of the fluid transport channel 40 is open at interface 18 so as to collect fluid between faces of the first surface member 12 and second surface member 14.

As illustrated, the fluid transport channel 40 may include an outboard leg 42 extending radially from an outboard edge of first seal seating depression 32 along interface 18 to an exterior location so as to define an exterior port 44 at an exterior location on the faceplate connection assembly 10. Thus, fluid may flow between face surfaces through fluid transport channel 40 from seal seating depression 32 to the exterior port 44.

The fluid transport channel 40 may also include an inboard leg 46 used alone or in combination with outboard leg 42. By way of example, such an inboard leg 46 may extend radially from an inboard edge of first seal seating depression 32 into intersecting fluid communicating relation with interior containment volume 20. In the event that both an outboard leg 42 and inboard leg 46 are utilized, it is contemplated that these legs may be substantially aligned along a common line crossing the seal seating depression so as to form a substantially continuous flow channel.

The fluid transport channel 40 may be characterized by an adequate depth to permit measurable fluid transport along interface 18. By way of example only, and not limitation, it is contemplated that the fluid transport channel 40 may have a depth of about 100 microns although deeper or shallower depths may be utilized if desired. Depth may be either variable or uniform along the length of fluid transport channel 40. Although fluid transport channel 40 is illustrated in FIG. 4 as incorporating a substantially hemispherical cross section, it is likewise contemplated that any number of other cross-sectional geometries may be utilized if desired. By way of example only, and not limitation, other cross-sectional geometries may include a curved base with substantially straight side walls, a flat base with substantially straight side walls, and other configurations as may be desired. The fluid transport channel 40 may be formed by any suitable technique as may be desired including machining, laser etching, chemical etching and the like. While various depths and configurations may be utilized for fluid transport channel 40, it is nonetheless desirable for the dimensions of the fluid transport channel 40 to be such that the presence of a properly functioning seal element 30 blocks fluid communication between fluid transport channel 40 and the seal seating depression to facilitate testing of seal integrity as described further hereinafter.

As best illustrated through reference to FIGS. 2 and 3, it is contemplated that the fluid transport channel 40 may work alone or in combination with existing voids between faces of the first surface member 12 and the second surface member 14 to define a flow path from the interior containment volume 20 to the exterior port 44, wherein the flow path will be normally blocked by a properly functioning seal element 30. Such an arrangement facilitates effective testing of the presence and performance of the seal element 30.

By way of example only, according to one testing procedure, interior containment volume 20 may be pressurized with a detectable tracer fluid such as gaseous helium or the like such that the tracer fluid will seek to escape through fluid transport channel 40 as illustrated by directional arrows in FIG. 3. In the event that the seal element 30 is present and functions properly, the tracer fluid will be blocked at the inboard edge of the seal seating depression 32 and will be prevented from migrating to the outboard leg 42 of the fluid transport channel 40. Thus, the tracer fluid will not be detectable at the exterior port 44. Conversely, any detection of the tracer fluid at the exterior port 44 indicates migration of the tracer fluid across the seal seating depression, thereby indicating that the seal element 30 is missing or defective.

By way of further example, according to another testing procedure a detectable tracer fluid such as gaseous helium or the like may be introduced into the exterior port 44 such that the racer fluid flows towards the outboard edge of the seal seating depression. In the event that the seal element 30 is present and functions properly, the tracer fluid will be blocked at the outboard edge of the seal seating depression and will be prevented from migrating to the inboard leg 46 of the fluid transport channel 40. Thus, the tracer fluid will not be detectable within interior containment volume 20. Conversely, any detection of the tracer fluid at the interior containment volume 20 indicates migration of the tracer fluid across the seal seating depression, thereby indicating that the seal element 30 is missing or defective.

By way of further example, it is contemplated that a tracer fluid may not be required for leak detection. Rather, the device incorporating faceplate connection assembly 10 may simply be filled with an operating fluid. Leakage across seal element 30 will result in fluid being expelled at exterior port 44 and will thus be detectable by simple visual inspection of the device.

INDUSTRIAL APPLICABILITY

The industrial applicability of the faceplate connection assembly described herein will be readily appreciated from the foregoing discussion. The present disclosure is applicable to substantially any device utilizing faceplate connections incorporating compressible seal elements to provide fluid tight seals resistant to leakage and/or contamination. Non-limiting examples of such devices include pressurized hose connections within pneumatic or hydraulic systems; connections in pressurized fluid transport systems such as pipelines and the like; connections in pressurized vessels such as chemical reaction vessels and the like; and connections in systems incorporating interior vacuum chambers.

The system and technique described herein allow for the detection of missing or defective seal elements in environments which might otherwise appear fluid tight upon initial assembly. For example, as part of an initial quality control testing procedure, a face plate connection may be subjected to testing for fluid tight character. In the event that an intended compressible seal element is omitted or damaged during assembly, the system and testing technique described herein will provide an immediate indication that the connection is not fluid tight thereby prompting a reexamination of the connection assembly and permitting early stage remediation of the defect. However, in the event that the connection is properly assembled, a fluid tight seal is obtained and maintained. The system and technique may also facilitate post-assembly maintenance by permitting seal integrity to be checked without disassembling the connection.

It will be appreciated that the foregoing description provides examples of the disclosed system and technique. However, it is contemplated that other implementations of the disclosure may differ in detail from the foregoing examples. All references to examples herein are intended to reference the particular example being discussed at that point and are not intended to imply any limitation as to the scope of the disclosure or claims more generally. All language of distinction and disparagement with respect to certain features is intended to indicate a lack of preference for those features, but not to exclude such from the scope of the claims entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure contemplates the inclusion of all modifications and equivalents of the subject matter recited in the appended claims as permitted by applicable law. Moreover, any combination of the above-described elements in all possible variations thereof is contemplated unless otherwise indicated herein or otherwise clearly contradicted by context.

What is claimed is:

1. A faceplate connection assembly adapted to promote detection of a missing or defective seal element, the connection assembly comprising:
    a first surface member having a first face;
    a second surface member having a second face, at least a portion of said second face being adapted for disposition in opposing relation to at least a portion of said first face to define an interface;
    a seal seating depression disposed at least partially across at least one of said first face and said second face, said seal seating depression being adapted to accept a compressible seal element; and
    a fluid transport channel of open groove construction disposed in intersecting relation to said seal seating depression, at least a portion of said fluid transport channel extending adjacent to and opening into said interface between said first face and said second face, said fluid transport channel being in fluid communication with a port at an exterior portion of the faceplate connection assembly.

2. A faceplate connection assembly as recited in claim 1, wherein said fluid transport channel includes an inboard leg extending away from an inner edge of said seal seating depression, said inboard leg being in fluid communication with an interior containment volume.

3. A faceplate connection assembly as recited in claim 1, wherein said fluid transport channel includes an outboard leg extending away from an outer edge of said seal seating depression.

4. A faceplate connection assembly as recited in claim 3, wherein said outboard leg extends to said port at said exterior portion of the faceplate connection assembly.

5. A faceplate connection assembly as recited in claim 1, wherein said fluid transport channel includes an outboard leg extending away from an outer edge of said seal seating depression and an inboard leg extending away from an inner edge of said seal seating depression, said inboard leg being in fluid communication with an interior containment volume.

6. A faceplate connection assembly as recited in claim 5, wherein said outboard leg extends to said port at said exterior portion of the faceplate connection assembly.

7. A faceplate connection assembly as recited in claim 5, wherein said outboard leg and said inboard leg are substantially aligned along a common line intersecting said seal seating depression.

8. A faceplate connection assembly as recited in claim 5, wherein said faceplate connection assembly is adapted for disposition in connective relation to a pressurized interior containment volume.

9. A faceplate connection assembly as recited in claim 5, wherein said faceplate connection assembly is adapted for disposition in connective relation to an interior containment volume maintained under at least partial vacuum.

10. A faceplate connection assembly adapted to promote detection of a missing or defective seal element, the connection assembly comprising:
a first surface member having a first face;
a second surface member having a second face, at least a portion of said second face being adapted for disposition in opposing relation to at least a portion of said first face to define an interface;
a seal seating depression disposed at least partially across at least one of said first face and said second face, said seal seating depression being adapted to accept a compressible seal element; and
a fluid transport channel of open groove construction disposed in intersecting relation to said seal seating depression, at least a portion of said fluid transport channel extending adjacent to and opening into said interface between said first face and said second face, said fluid transport channel being in fluid communication with a port at an exterior portion of the faceplate connection assembly, wherein said fluid transport channel includes an outboard leg extending radially away from an outer edge of said seal seating depression and an inboard leg extending radially away from an inner edge of said seal seating depression, said inboard leg being in fluid communication with an interior containment volume, wherein said outboard leg and said inboard leg are substantially aligned along a common line intersecting said seal seating depression and wherein said outboard leg is substantially aligned with said port at said exterior portion of the faceplate connection assembly.

11. A faceplate connection assembly as recited in claim 10, wherein said faceplate connection assembly is adapted for disposition in connective relation to a pressurized interior containment volume.

12. A faceplate connection assembly as recited in claim 10, wherein said faceplate connection assembly is adapted for disposition in connective relation to an interior containment volume maintained under at least partial vacuum.

13. A method of detecting a missing or defective seal element in a faceplate connection assembly, the method comprising the steps of:
providing a first surface member having a first face and a second surface member having a second face, at least a portion of said second face being adapted for disposition in contacting opposing relation to at least a portion of said first face to define an interface and wherein a seal seating depression is disposed at least partially across at least one of said first face and said second face, said seal seating depression being adapted to accept a compressible seal element and wherein a fluid transport channel of open groove construction is disposed in intersecting relation to said seal seating depression;
operatively connecting said first surface member to said second surface member such that at least a portion of said fluid transport channel extends adjacent to said interface and is open along said interface between said first face and said second face;
introducing a tracer fluid at a predefined edge of said seal seating depression through said fluid transport channel; and
monitoring the migration of said tracer fluid across said seal seating depression.

14. The method of detecting a missing or defective seal element in a faceplate connection assembly as recited in claim 13, wherein said tracer fluid is gaseous helium.

15. The method of detecting a missing or defective seal element in a faceplate connection assembly as recited in claim 13, wherein said fluid transport channel includes an outboard leg extending radially away from an outer edge of said seal seating depression and an inboard leg extending radially away from an inner edge of said seal seating depression, said inboard leg being in fluid communication with an interior containment volume and wherein said tracer fluid is introduced at said inner edge of said seal seating depression through said inboard leg by pressurizing said interior containment volume.

16. The method of detecting a missing or defective seal element in a faceplate connection assembly as recited in claim 15, wherein migration of said tracer fluid across said seal seating depression is monitored at a port at an exterior portion of the faceplate connection assembly, wherein said port is in fluid communication with said outboard leg.

17. The method of detecting a missing or defective seal element in a faceplate connection assembly as recited in claim 16, wherein said outboard leg extends to said port at said exterior portion of the faceplate connection assembly.

18. The method of detecting a missing or defective seal element in a faceplate connection assembly as recited in claim 13, wherein said fluid transport channel includes an outboard leg extending radially away from an outer edge of said seal seating depression and an inboard leg extending radially away from an inner edge of said seal seating depression, said inboard leg being in fluid communication with an interior containment volume and wherein said tracer fluid is introduced at said outer edge of said seal seating depression through said outboard leg by injecting said tracer fluid into a port in fluid communication with said outboard leg.

19. The method of detecting a missing or defective seal element in a faceplate connection assembly as recited in claim 18, wherein said outboard leg extends to said port.

20. The method of detecting a missing or defective seal element in a faceplate connection assembly as recited in claim 18, wherein migration of said tracer fluid across said seal seating depression is monitored at said interior containment volume.

* * * * *